(12) United States Patent
Hedderich

(10) Patent No.: US 11,096,503 B2
(45) Date of Patent: Aug. 24, 2021

(54) DEVICE FOR PRESENTING SMALL ARTICLES IN SALES SHELF SYSTEMS

(71) Applicant: eLED Revolution GmbH, Hochdorf-Assenheim (DE)

(72) Inventor: Philipp Hedderich, Hochdorf-Assenheim (DE)

(73) Assignee: eLED Revolution GmbH, Hochdorf-Assenheim (DE)

( * ) Notice: Subject to any disclaimer, the term of this patent is extended or adjusted under 35 U.S.C. 154(b) by 0 days.

(21) Appl. No.: 16/615,917

(22) PCT Filed: May 22, 2018

(86) PCT No.: PCT/EP2018/063312
§ 371 (c)(1),
(2) Date: Nov. 22, 2019

(87) PCT Pub. No.: WO2018/215416
PCT Pub. Date: Nov. 29, 2018

(65) Prior Publication Data
US 2020/0128973 A1  Apr. 30, 2020

(30) Foreign Application Priority Data
May 23, 2017  (DE) .......................... 102017111241.3

(51) Int. Cl.
*A47F 3/00*  (2006.01)
*A47F 5/00*  (2006.01)
(Continued)

(52) U.S. Cl.
CPC ............ *A47F 3/002* (2013.01); *A47F 5/0043* (2013.01); *A47F 7/0246* (2013.01); *E05B 73/0082* (2013.01)

(58) Field of Classification Search
CPC ...... A47F 3/002; A47F 5/0043; A47F 7/0246; A47F 7/024; A47F 7/0243;
(Continued)

(56) References Cited

U.S. PATENT DOCUMENTS 1,184,246 A * 5/1916 Klein ................... A47B 23/042
248/448
3,984,075 A * 10/1976 Bahner ............... E05B 73/0082
248/552

(Continued)

FOREIGN PATENT DOCUMENTS

DE        60115879       8/2006
DE     202014102518      7/2015
(Continued)

Primary Examiner — Jennifer E. Novosad
(74) Attorney, Agent, or Firm — McHale & Slavin, P.A.

(57) ABSTRACT

A device for presenting small articles in retail shelf systems (1). The device may include a lower part (3) cooperating with the shelf system, an upper part (2) that can be connected to the lower part (3) and a holder (4) for the small article, wherein the lower part (3) and the upper part (2) can be connected via a latching connection or a clamping connection via connecting elements (5) which are formed on the lower part (3) and/or on the upper part (2) and which engage in corresponding receiving openings (12) in the mating piece, and the holder (4) for the small article is connected laterally to the lower part (3) and/or the upper part (2), and at least two holding wings (15) for receiving the small article are formed on the upper side of said holder.

8 Claims, 4 Drawing Sheets

(51) Int. Cl.
*A47F 7/024* (2006.01)
*E05B 73/00* (2006.01)

(58) Field of Classification Search
CPC .... E05B 73/0082; E05B 73/00; E05B 69/006;
F16M 11/041; F16M 11/04; F16M
13/022; F16M 13/02
USPC .......... 211/4, 41.2, 85.26, 119.003; 248/235,
248/240.3, 245, 246, 247, 248, 250,
248/220.21, 220.22, 222.11, 274.1, 309.1,
248/310, 316.1, 316.7, 316.8, 316.4;
40/655, 658
See application file for complete search history.

(56) References Cited

U.S. PATENT DOCUMENTS

| | | | | |
|---|---|---|---|---|
| 6,364,124 B1 * | 4/2002 | Chen | ................ | A47F 7/0243 |
| | | | | 211/4 |
| 6,932,221 B2 * | 8/2005 | McMurray | ............ | A47F 5/0861 |
| | | | | 211/4 |
| 7,434,699 B2 * | 10/2008 | Stukenberg | .......... | A47G 1/1646 |
| | | | | 211/41.1 |
| 8,931,746 B2 * | 1/2015 | Fanning, Jr. | .......... | A47F 7/0007 |
| | | | | 248/220.31 |
| 8,991,624 B2 * | 3/2015 | Brozak | ................ | A47F 5/0068 |
| | | | | 211/85.26 |
| 9,581,180 B2 * | 2/2017 | Lien | ................ | F16M 13/00 |
| 9,695,849 B2 * | 7/2017 | Zhou | ................ | F16B 2/12 |
| 9,961,306 B1 * | 5/2018 | Lev | ................ | F16M 13/022 |
| 9,972,178 B2 * | 5/2018 | Richardson | ........ | G06Q 30/0185 |
| 10,619,383 B2 * | 4/2020 | Bacallao | ................ | E05B 73/0005 |
| 2003/0094428 A1 * | 5/2003 | Ploix | ................ | A47B 96/025 |
| | | | | 211/187 |
| 2004/0069920 A1 * | 4/2004 | Dirks | ................ | H02G 3/18 |
| | | | | 248/316.7 |
| 2009/0173863 A1 * | 7/2009 | Crown | ................ | F16M 13/00 |
| | | | | 248/316.4 |
| 2011/0126436 A1 * | 6/2011 | Brozak | ................ | A47F 7/147 |
| | | | | 40/124.2 |
| 2011/0186530 A1 * | 8/2011 | Karel | ................ | A47F 7/024 |
| | | | | 211/4 |
| 2012/0205326 A1 * | 8/2012 | Richter | ................ | A47F 7/024 |
| | | | | 211/4 |
| 2013/0301216 A1 * | 11/2013 | Trinh | ................ | A47F 7/0246 |
| | | | | 361/679.58 |
| 2014/0021315 A1 * | 1/2014 | Johnson | ................ | A47B 96/07 |
| | | | | 248/276.1 |
| 2015/0208826 A1 * | 7/2015 | Yang | ................ | A47F 3/002 |
| | | | | 248/551 |
| 2015/0300050 A1 * | 10/2015 | Van Balen | ............ | A47F 5/0087 |
| | | | | 248/551 |
| 2018/0058107 A1 * | 3/2018 | Lucas | ................ | F16M 11/041 |
| 2018/0092472 A1 * | 4/2018 | Haroush | ................ | A47F 11/10 |
| 2018/0153317 A1 * | 6/2018 | Haroush | ................ | A47F 7/024 |
| 2018/0217636 A1 * | 8/2018 | McNamara | ................ | H01R 35/04 |
| 2018/0279805 A1 * | 10/2018 | Galant | ................ | F16M 11/041 |
| 2018/0279809 A1 * | 10/2018 | Regan | ................ | F16B 43/025 |
| 2019/0392690 A1 * | 12/2019 | Helman | ................ | A47F 5/00 |
| 2020/0107653 A1 * | 4/2020 | Leyden | ................ | A47F 7/024 |
| 2020/0128973 A1 * | 4/2020 | Hedderich | ................ | A47F 3/002 |
| 2020/0211424 A1 * | 7/2020 | Taylor | ................ | A47F 5/0043 |

FOREIGN PATENT DOCUMENTS

| | | | |
|---|---|---|---|
| EP | 1037547 | 8/2003 | |
| FR | 2659541 | 9/1991 | |
| WO | WQ-2014078966 A1 * | 5/2014 | ............. F16M 11/06 |

* cited by examiner

DEVICE FOR PRESENTING SMALL ARTICLES IN SALES SHELF SYSTEMS

CROSS REFERENCE TO RELATED APPLICATIONS

This is a national stage filing in accordance with 35 U.S.C. § 371 of PCT/EP2018/063312, filed May 22, 2018, which claims the benefit of the priority of German Patent Application No. 102017111241.3, filed May 23, 2017, the contents of each are incorporated herein by reference.

TECHNICAL FIELD

The present invention relates to a device for presenting small articles in retail shelf systems.

For the presentation of goods, shelf systems are used, which are equipped with different anti-theft devices in order to protect the goods presented in department stores from theft. However, it is desirable that the customer can continue to inspect and touch the goods in order to collect haptic impressions and make his purchasing decision. An appealing presentation of the small articles can promote sales. Especially with high-priced articles, such as razors or razor blades, there is a costly theft problem, which has resulted in the fact that these articles are presented only behind closed glass showcases. Open shelves, however, are sales-promoting and offer the customer direct access to the goods.

STATE OF THE ART

The DE 20 2014 102 518 U1 describes a presentation device having an upper, substantially horizontally extending end wall, which has a number of insertion openings according to the predetermined number of presented articles, said openings being accessible from the top, and which is especially suitable for tools such as pliers, screwdrivers, etc. However, for objects to be presented in a lying position, this presentation bar is not suitable. Furthermore, there is no adequate theft protection.

EP 10 37 547 B1 describes a device for burglar-proof presentation of items. Here, the goods are equipped with shackles, which are provided with retainers at one end in order to prevent the removal of the items from the shackles, and which are provided with a members at the other end in order to serve the mounting and the removal of the goods. The shackles are suspended from a main support. The main support can be secured against theft.

However, this type of suspension is only suitable for certain small articles, especially since the goods cannot be removed from the hangers in order to be touched.

DE 601 15 879 T2 describes an individual anti-theft device for a ring, comprising a rigid shell, which is formed by assembling two half-shells. In this device, a ring is held on the surface of the shell in a tight, respectively tangential manner by means of a retaining device, which is enclosed between the two half-shells.

FR 2 659 541 A1 describes a device for presenting jewelry, comprising a base element whose upper side is adapted to receive and hold a ring-shaped piece of jewelry as well as a removable hollow lid. The base element is equipped with devices which limit the intrusion of the base element into the lid.

DETAILED DESCRIPTION OF THE INVENTION

It is the object of the present invention to provide an improved device for the presentation of small articles that allows for a sales-promoting, open presentation of the goods, but at the same time also allows for a simple but effective protection against theft of the goods.

The object is achieved by a device comprising the features of claim 1. Preferred embodiments of the invention are specified in the sub-claims.

The device according to the invention consists of a lower part cooperating with the shelf system, an upper part which is connectable to the lower part, and a holder for the small article. The lower part and the upper part can be connected via a latching connection or a clamping connection with one or more connecting elements being formed on the lower part and/or on the upper part, which engage in corresponding receiving openings in the mating piece (namely the upper part or the lower part). According to the invention, the holder for the small article is laterally connected to the lower part and/or the upper part and comprises at least two holding wings for receiving the small article. These holding wings already provide a simple protection against "fast theft" because the small article is clamped into the space between the holding wings.

The three-part construction of the device according to the invention is particularly adaptable in case of assortment changes. Thus, if necessary, the upper part can be removed and replaced by simply removing the holder, without having to dismount the lower part which cooperates with the shelf system. This offers a time-saving advantage, especially when articles in a shelf or in a shelf system need to be replaced. The small article, preferably a razor or a shaving system, is held by the two holding wings formed on the upper part, which are preferably spaced parallel to one another and laterally encompass the small article.

In a preferred embodiment, the upper part comprises at its ends a head leg angled upwards and/or a foot leg angled downwards, wherein the upper part shows an arcuate curvature in its longitudinal extension, at least in sections. On the one hand, this design makes it possible to place product information on the inside of the head leg of the upper part on the other hand, the curvature allows an appealing presentation and removal of the product.

Preferably, the holder comprises on its upper side an through-going opening for an eyelet and a receiving compartment for an anti-theft device. This way, the small article to be presented can be connected to the eyelet via a wire cord and thus is additionally secured against theft. Further connections between the eyelet and the small article known to a person skilled in the art, which are not mentioned, are also covered by the invention.

In a preferred embodiment, the holder additionally comprises a latch on its underside which, in assembled state, evenly snaps into a lateral recess in the lower part. When attached to a shelf, this additional anti-theft device prevents possible lateral removal of the holder at right angles to the lower part.

Preferably, the holder comprises a notch on the front side facing the lower part, into which a connecting element of the upper part engages in assembled state. By this measure, it is ensured that, during the assembly process, the holder can only be pushed until the back face of the holder is flush with the side of the lower part facing the holder.

Preferably, the holder comprises at its left and right sides nubs protruding beyond its surface for coupling the holder to the connecting elements of the upper part. The so coupled nubs prevent the holder from slipping out of the device during installation.

In a preferred embodiment, in order to stabilize the front of the upper part, the lower part shows an upwardly protruding support plate, upon which the head part of the upper part can be placed in assembled state. In order to attach the device to the retaining channel of a shelf system, a downwardly facing U-profile and an additional latching lug are formed frontally below the support plate of the lower part.

Advantageously, the connecting elements for the upper and lower part are designed as longitudinal ribs, transverse ribs or nubs. The connecting elements can either be formed on the upper part and/or on the lower part and engage in the corresponding receiving openings of the respective counterpart (i.e. either the lower part or the upper part) in order to connect the upper part and the lower part to one another.

The invention also relates to a retail shelf system for presenting small articles comprising a shelf with several shelf segments and devices connected to the shelf segments according to the invention. Of course, other securing options can be provided than nubs, for example latching lugs or clamping elements. The retail shelf system according to the invention consists of individual shelves comprising retaining channels which cooperate with the U-profile of the lower part of the presentation device according to the invention.

BRIEF DESCRIPTION OF THE FIGURES

Preferred embodiments of the present invention will be explained in more detail with reference to the accompanying figures.

WAYS OF CARRYING OUT THE INVENTION AND INDUSTRIAL APPLICABILITY

Figure 1A:
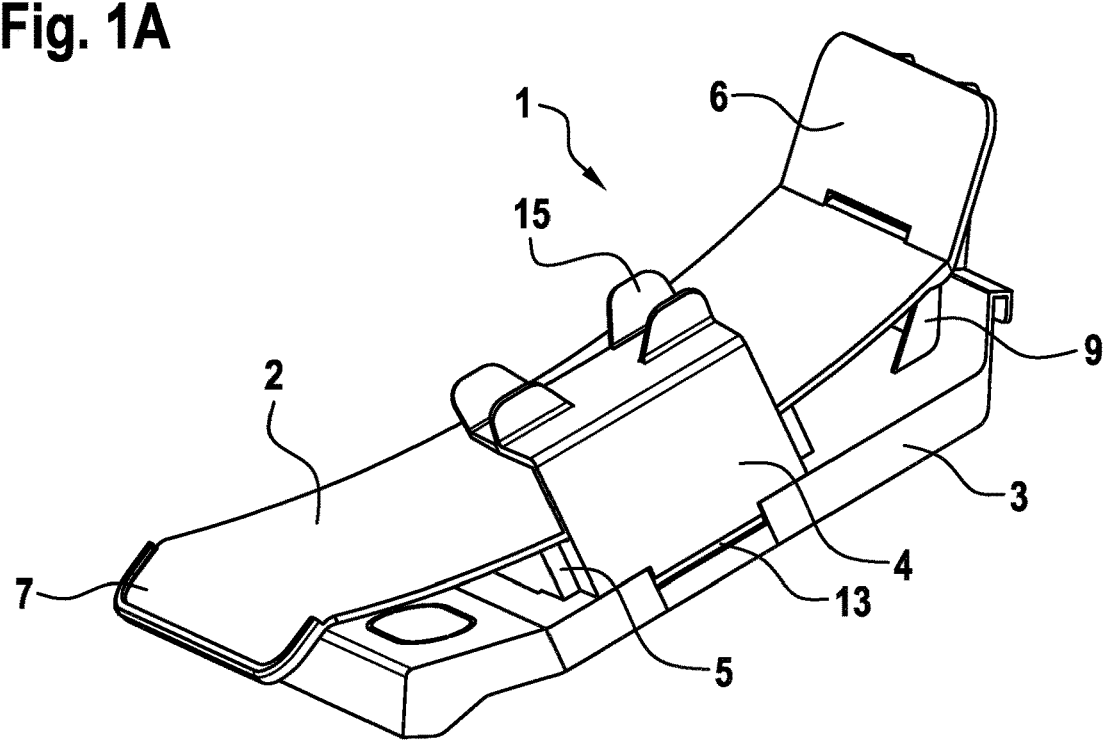
FIG. 1A is a side perspective view of an embodiment of the device according to the invention.

Referring to FIG. 1, the device 1 according to the invention is illustrated without a shelf system. The device according to FIG. 1A is composed of a lower part 3, an upper part 2 connectable to the lower part 3, and a holder 4. The lower part 3 and the upper part 2 are connected to each other via a latching connection or a clamping connection. For this purpose, one or more connecting elements 5 are provided, which engage in corresponding receiving openings 12 (see FIG. 3A) in the mating piece. Furthermore, there is a support leg 9 formed on the upper side of the lower part 3 in order to support the upper part 2.

The lower part 3 also shows a recess 13 in the lower part, which cooperates with a locking bar 25 formed on the holder 4 and connects the holder with the lower part 3. On the underside of the upper part 2 there are connecting elements 5 in the form of transverse ribs which latch into corresponding receiving openings 12 of the lower part 3. Furthermore, the upwardly angled head leg 6 and the downwardly angled foot leg 7 of the upper part 2 can be seen. Optionally, product information for customers can be placed on the head leg 6 or on the foot leg 7.

Figure 1B:
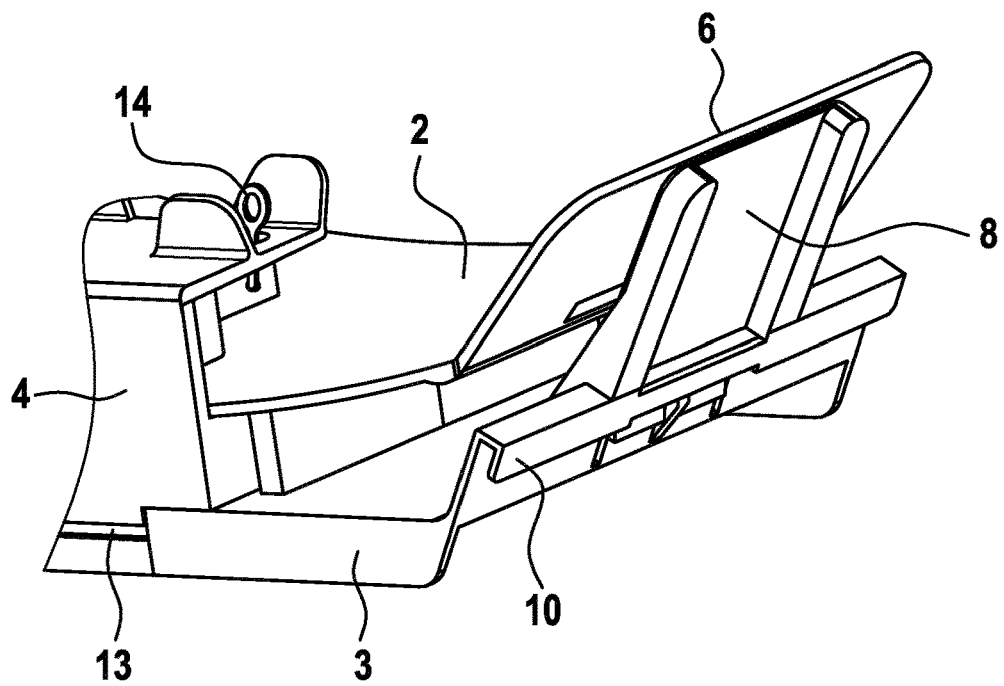
FIG. 1B is a side perspective sectional view of the embodiment shown in FIG. 1A with further details.

FIG. 1B shows a sectional view of the head piece of the device according to the invention. In addition, an anti-theft device between the two holding wings 15 of the holder 4 can be seen, which comprises an eyelet 14, which is connected to a wire cord. The eyelet 14 is connected to the razor. A wire coil ensures that the wire cord is extendable. A spring mechanism rewinds the wire cord onto the spool.

Furthermore, it is preferably provided that at its head end, the lower part 3 shows a protruding support plate 8 opposite the surface of the upper part 2 upon which the head part 6 of the upper part 2 can be placed in assembled state.

Also, the lower part 3 shows a transverse U-profile 10 at its front end for connecting and attaching the lower part 3 to a shelf system. A retaining channel is provided in the retail shelf, into which the U-profile 10 engages.

Figure 2:
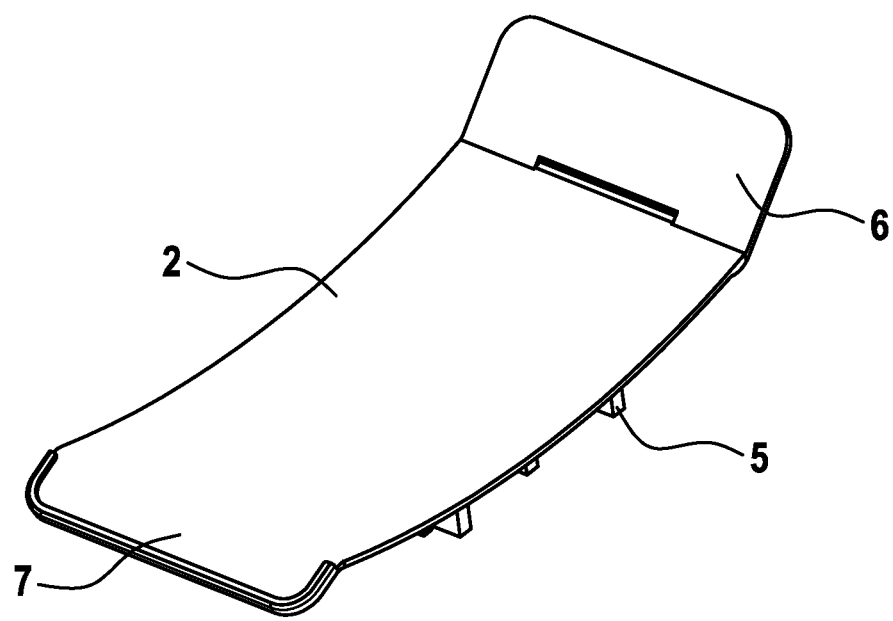
FIG. 2 is a side perspective view of an embodiment of the upper part.

FIG. 2 shows a preferred embodiment of the upper part 2. At its end faces, the upper part 2 shows an upwardly angled head leg 6 and a downwardly angled foot leg 7 respectively. In the embodiment shown in FIG. 2, the upper part 2 is arcuately curved.

Figure 3A:
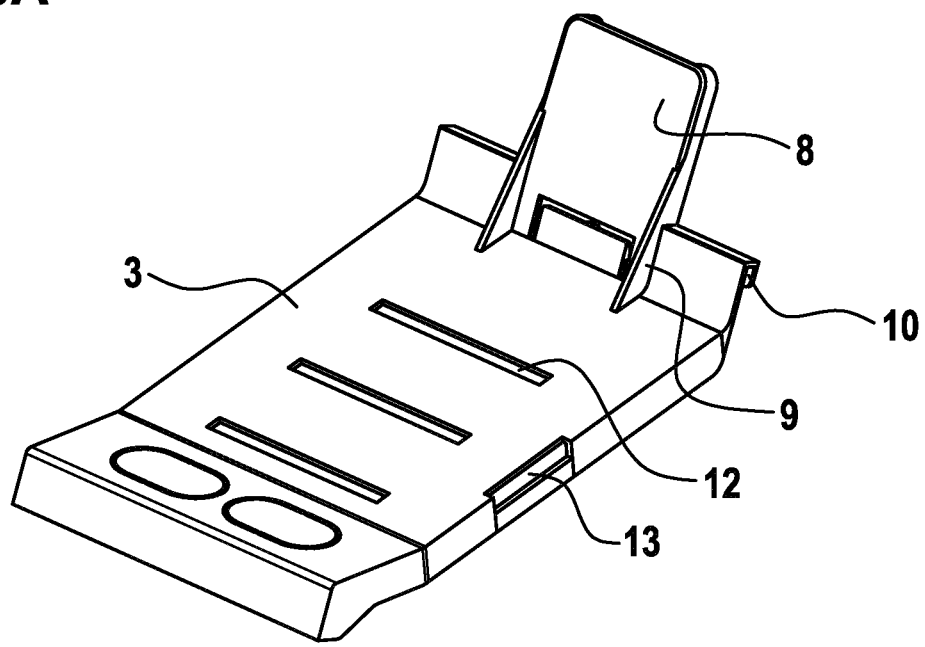
FIG. 3A is a side perspective view of an embodiment of the lower part.

In FIG. 3, the lower part 3 is shown in detail. In the embodiment of the lower part 3 shown in FIG. 3A, receiving openings 12 formed as horizontal slots, are provided for receiving the connecting elements 5. However, the receiving openings 12 may be formed differently according to the shape of the connecting elements 5.

To a person skilled in the art, it will be apparent that the connecting elements 5 may be formed either on the upper part 2 or on the lower part 3. In a variant, the connecting elements are formed on the lower part 3 and the corresponding receiving openings 12 are included in the upper part 2 (not shown).

Figure 3B:
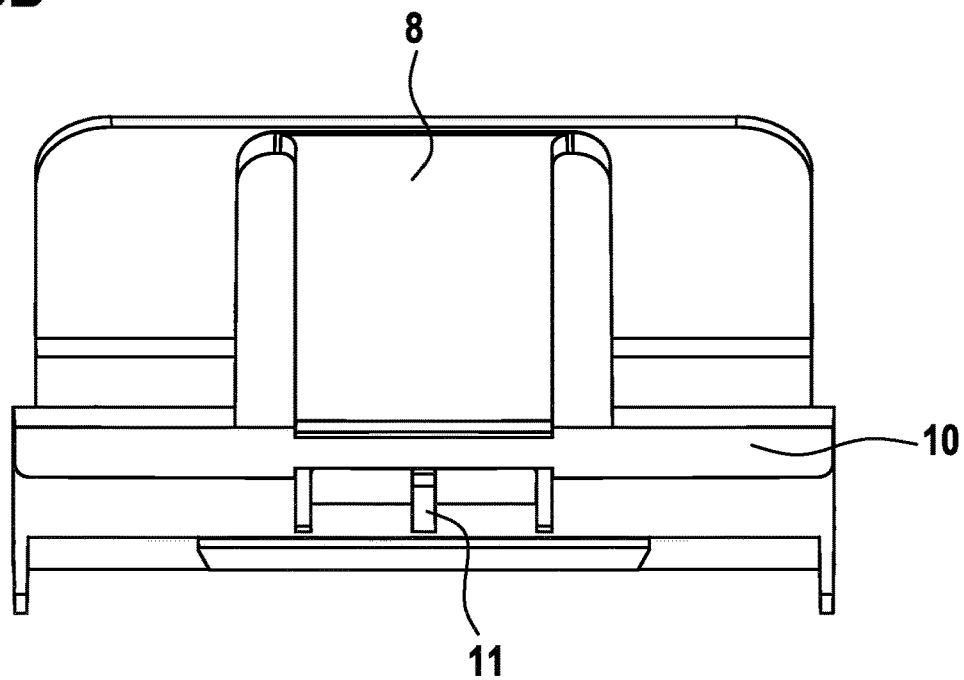
FIG. 3B is a rear view of the embodiment of the lower part as shown in FIG. 3A.

FIG. 3B shows the downwardly oriented U-profile 10 on the rear end of the lower part 3. For latching an additional latching lug 11 is provided.

Figure 4A:
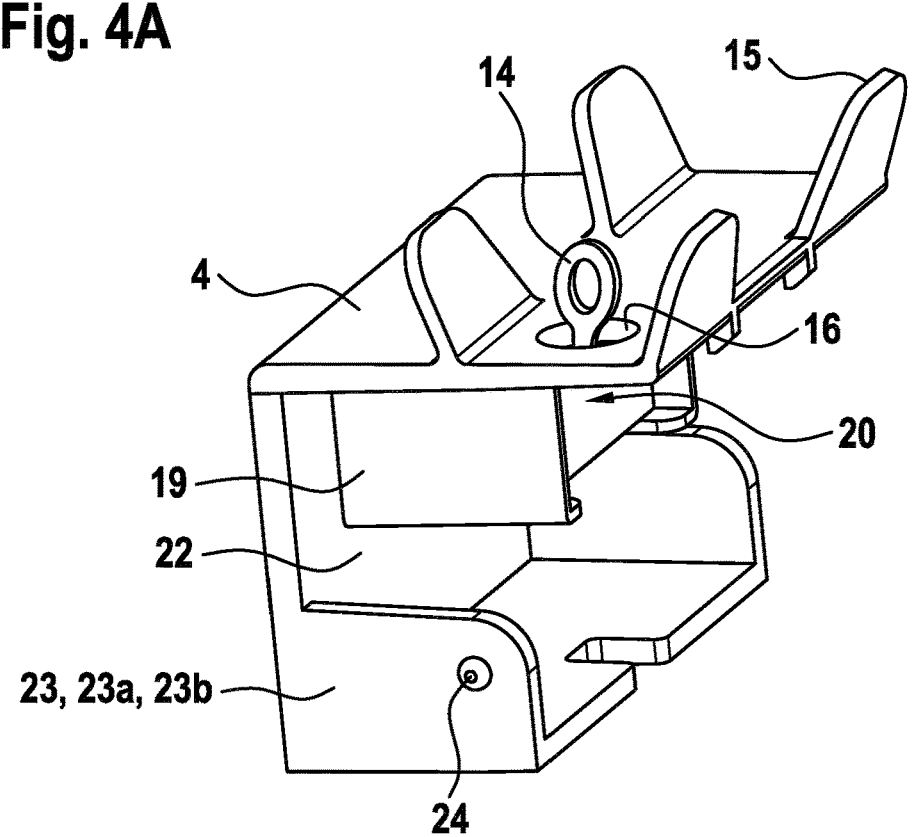
FIG. 4A is a front view of an embodiment of the holder.
Figure 4B:
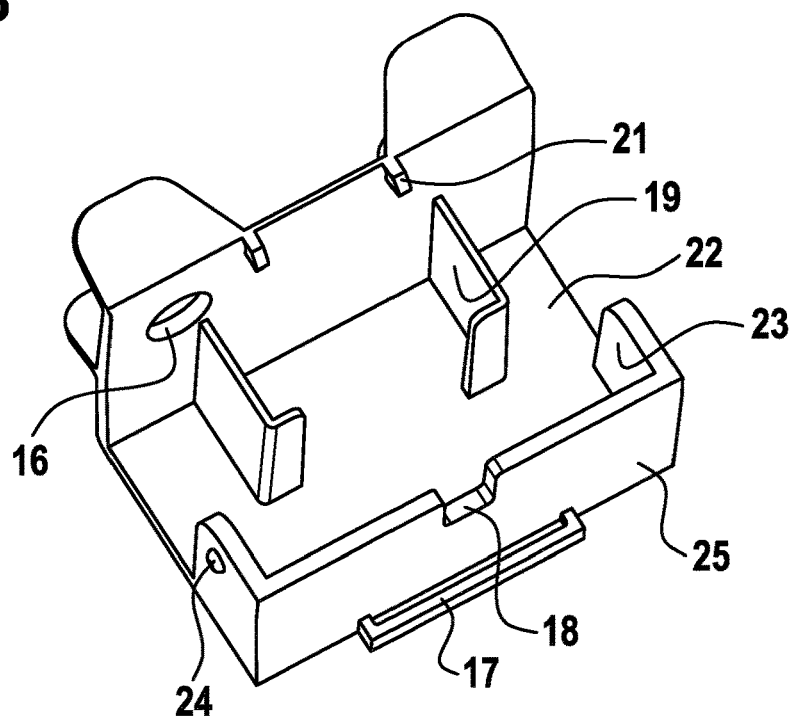
FIG. 4B is a side perspective view of the embodiment of the holder as shown in FIG. 4A.
Figure 4C:
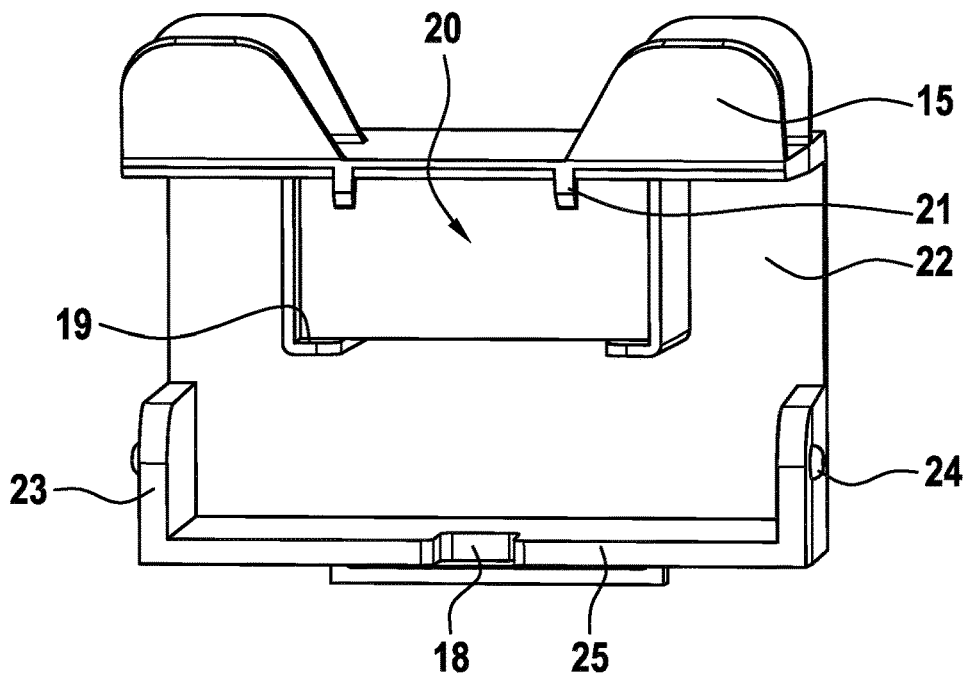
FIG. 4C is a side view of the embodiment of the holder shown in FIG. 4A including the installed anti-theft device.

FIG. 4 shows the holder 4 according to the invention in detail. According to FIG. 4A, the holder 4 has at least two holding wings 15 for receiving the razor (or other small article) on its upper side. Depending on the type of small article to be presented, the retaining wings 15 of the holder 4 different may have different shapes or dimensions. An end wall 22 is located at the outside and connected to a locking bar 25 which cooperates with the upper part 2.

Additionally, on its upper side, the holder 4 comprises an opening 16 for an eyelet 14 and a receiving compartment 19 for an anti-theft device 20. The eyelet 14 can be attached directly to the small article. The anti-theft device 20 may additionally be equipped with an alarm protection. Furthermore, the holder 4 according to FIG. 4B comprises a receiving compartment 19 and a latch 21 serving as a supplementary fixation of the anti-theft device 20.

The embodiment of the holder 4 shown in FIG. 4B shows a locking bar 25 on its underside which, in assembled state, evenly snaps into a lateral recess 13 formed on the lower part 3. In the variant shown, the locking bar 25 is provided with a notch 18 into which, in assembled state, engages a connecting element 5 of the upper part 2.

In this embodiment, an additional end element 17 is shown, which, in assembled state, conceals the connection between the holder 4 and the lower part 3.

Furthermore, in the illustrated embodiment, the holder 4 shows nubs 24 (optional) protruding beyond its surface on its left and right lateral sections 23. In the assembled state, these nubs 24 press against the two outer connecting elements 5 of the upper part 2 and thus ensure additional fixing of the holder 4.

Furthermore, a retail shelf system for presenting small articles is provided (not shown). The shelf has several shelf segments and the device according to the invention can be attached to these shelf segments by means of its downward-pointing U-profile 10 and an optional additional latching lug 11.

LIST OF REFERENCE NUMBERS

| | |
|---|---|
| 1 | total device |
| 2 | upper part |
| 3 | lower part |
| 4 | holder |
| 5 | connecting element (transverse rib) |
| 6 | head leg |
| 7 | foot leg |
| 8 | support plate |
| 9 | support legs |
| 10 | U-profile |
| 11 | latching lug |
| 12 | receiving openings |
| 13 | recess |
| 14 | eyelet |
| 15 | holding wings |
| 16 | through-going opening |
| 17 | end element |
| 18 | notch |
| 19 | receiving compartment |
| 20 | anti-theft device |
| 21 | latch |
| 22 | end wall |
| 23 | lateral section |
| 24 | nubs |
| 25 | locking bar |

The invention claimed is:

1. A device for presenting articles in retail shelf systems, consisting of
a lower part configured to cooperate with a shelf system,
an upper part configured to be connected to the lower part,
a holder for holding an article, wherein
the lower part and the upper part can be connected via a latching connection or a clamping connection via connecting elements which are formed on the lower part or on the upper part and which engage in corresponding receiving openings in the upper part or the lower part,
the holder for holding the article is laterally connected to the lower part or the upper part and at least two holding wings for receiving the article are formed on the upper side of said holder,
wherein the upper part comprises a head leg angled upwards and a foot leg angled downwards, and has an arcuate curvature.

2. The device according to claim 1 characterized in that the holder comprises on its upper side a through-going opening for an eyelet and a receiving compartment for an anti-theft device.

3. The device according to claim 1, characterized in that the holder comprises a locking bar on its underside configured to snap into a lateral recess in the lower part.

4. The device according to claim 1, characterized in that the holder comprises a notch on the front side facing the lower part into which the connecting element of the upper part engages.

5. The device according to claim 1, characterized in that the holder comprises, at its left and right lateral sections, protruding nubs for coupling the holder to the connecting elements of the upper part.

6. The device according to claim 1, characterized in that the lower part comprises at its front side a protruding support plate opposite the upper part, upon which the upper part can be placed.

7. The device according to claim 6, characterized in that a downward facing U-profile and a latching lug are formed below the support plate of the lower part for attaching said device to a retail shelf.

8. The device according to claim 1, characterized in that the connecting elements are formed as longitudinal ribs or transverse ribs on the upper part or on the lower part which engage in the corresponding receiving openings in the lower part or the upper part.

* * * * *